United States Patent
Ng et al.

(10) Patent No.: US 8,677,338 B2
(45) Date of Patent: Mar. 18, 2014

(54) DATA DEPENDENCE TESTING FOR LOOP FUSION WITH CODE REPLICATION, ARRAY CONTRACTION, AND LOOP INTERCHANGE

(75) Inventors: John L. Ng, San Jose, CA (US); Rakesh Krishnaiyer, Milpitas, CA (US); Alexander Y. Ostanevich, Moscow (RU)

(73) Assignee: Intel Corporation, Santa Clara, CA (US)

( * ) Notice: Subject to any disclaimer, the term of this patent is extended or adjusted under 35 U.S.C. 154(b) by 1559 days.

(21) Appl. No.: 12/133,285

(22) Filed: Jun. 4, 2008

(65) Prior Publication Data
US 2009/0307675 A1    Dec. 10, 2009

(51) Int. Cl.
*G06F 9/45* (2006.01)

(52) U.S. Cl.
USPC ............ 717/160; 717/151; 717/159; 717/161

(58) Field of Classification Search
USPC .................................. 717/101–178; 712/233
See application file for complete search history.

(56) References Cited

U.S. PATENT DOCUMENTS

| | | | |
|---|---|---|---|
| 5,781,777 A * | 7/1998 | Sato et al. ...................... | 717/160 |
| 5,802,375 A * | 9/1998 | Ngo et al. ...................... | 717/160 |
| 5,805,863 A * | 9/1998 | Chang ............................ | 717/158 |
| 6,038,398 A * | 3/2000 | Schooler ........................ | 717/160 |
| 6,058,266 A * | 5/2000 | Megiddo et al. ............... | 717/156 |
| 6,070,011 A * | 5/2000 | Liu et al. ........................ | 717/160 |
| 6,772,415 B1 * | 8/2004 | Danckaert et al. ............. | 717/161 |
| 7,086,038 B2 * | 8/2006 | Cronquist et al. ............. | 717/136 |
| 7,318,223 B2 * | 1/2008 | Blainey et al. ................. | 717/160 |
| 7,953,158 B2 * | 5/2011 | Liao et al. ................. | 375/240.26 |
| 8,087,010 B2 * | 12/2011 | Eichenberger et al. ........ | 717/150 |
| 8,087,011 B2 * | 12/2011 | Eichenberger et al. ........ | 717/151 |
| 2005/0246700 A1 * | 11/2005 | Archambault et al. ........ | 717/156 |
| 2006/0048122 A1 * | 3/2006 | Barton et al. .................. | 717/160 |
| 2007/0050603 A1 * | 3/2007 | Vorbach et al. ............... | 712/221 |
| 2007/0079298 A1 * | 4/2007 | Tian et al. ...................... | 717/140 |
| 2007/0083730 A1 * | 4/2007 | Vorbach et al. ................. | 712/10 |
| 2008/0263530 A1 * | 10/2008 | Rahavan et al. ............... | 717/159 |
| 2009/0083702 A1 * | 3/2009 | Eichenberger et al. ........ | 717/109 |
| 2009/0083722 A1 * | 3/2009 | Eichenberger et al. ........ | 717/146 |
| 2009/0083724 A1 * | 3/2009 | Eichenberger et al. ........ | 717/160 |
| 2009/0307673 A1 * | 12/2009 | Eichenberger et al. ........ | 717/160 |
| 2009/0307674 A1 * | 12/2009 | Ng et al. ........................ | 717/160 |

OTHER PUBLICATIONS

Fusion of Loops for Parallelism and Locality—Naraig Manjikian, Student Member, IEEE, and Tarek S. Abdelrahman, Member, IEEE Computer Society—IEEE Transactions on Parallel and Distributed Systems, vol. 8, No. 2, Feb. 1997.*

(Continued)

*Primary Examiner* — Lewis A Bullock, Jr.
*Assistant Examiner* — Francisco Aponte
(74) *Attorney, Agent, or Firm* — Caven & Aghevli LLC

(57) ABSTRACT

Methods and apparatus to data dependence testing for loop fusion, e.g., with code replication, array contraction, and/or loop interchange, are described. In one embodiment, a compiler may optimize code for efficient execution during runtime by testing for dependencies associated with improving memory locality through code replication in loops that enable various loop transformations. Other embodiments are also described.

18 Claims, 4 Drawing Sheets

(56) References Cited

OTHER PUBLICATIONS

Multi-dimensional Incremental Loop Fusion for Data Locality—Sven Verdoolaege, Maurice Bruynooghe, Gerda Janssens Katholieke Universiteit Leuven Dept. Compo Sc, Francky Catthoor IMEC Also prof. at K.U.Leuven—Proceedings of the Application-Specific Systems, Architectures, and Processors (ASAP'03) ISBN0-7695-1992-X/03 $17.00 © 2003 IEEE.*

Ng, John et al., "Inter-Procedural Loop Fusion, Array Contraction and Rotation", Proceedings of the 12th International Conference on Parallel Architectures and Compliation Techniques. Compilation Techniques, 2003, 11 pages,(2003).

Pugh, William "The Omega Test: A fast and practical integer programming algorithm for dependence analysis", Communications of the ACM, (1991), pp. 4-13.

Kennedy, Ken et al., "Optimizing for parallelism and data locality.", in Proceedings of the 1992 ACM International Conference of Supercomputing, (Jul. 1992), pp. 323-334.

Cooper, Keith D., et al., "Code Replication—for profit—", COMP 512, Rice University, 23 pages, (Spring 2006).

Mueller, Frank et al., "Avoiding Conditional Branches by Code Replication", Proceedings of the ACM SIGPLAN 1995 Conference on Programming Language Design and Implementation, (1995), pp. 55-66.

Banerjee, Utpal "Dependence Analysis", A Book Series on Loop Transformations for Restructuring Compliers, Chapters 5 & 6, (1997),pp. 121-169.

Allen, Randy et al., "Optimizing Compliers for Modern Architectures", Chapter 3,(2002), pp. 73-134.

Ng, John L. et al., "Improving Data Locality and Parallelism by Code Replication and Array Contraction", U.S. Appl. No. 12/133,268, filed Jun. 4, 2008.

* cited by examiner

Original Loop Nest:

```
do k=1,n
  do i=1,n
    do j=js-2,je+2
      vfl (j) =   vx(i,j,k) + vy(i,j,k)
      vt  (j) =
      bt  (j) = ...
    enddo do j=js-1,je+1
      dqm    = ( vt(j)   - vt(j-1) )
      dqp    = ( vt(j+1) - vt(j)   )
      dv (j) = dqm + dqp
      dqm    = ( bt(j)   - bt(j-1) )
      dqp    = ( bt(j+1) - bt(j)   )
      db (j) = dqm + dqp
    enddo do j=js,je+1
      vint(j)= ...
    enddo do j=js,je+1
      emf(i,j,k) = vint(j) + vt(j)
      emg(i,j,k) = ...
    enddo enddo
enddo
```

*FIG. 2*

After Code Replication & Fusion

```
do k=1,n
  do i=1,n
    do j=js,je+1
      vfl (j-2) = vx(i,j-2,k) + vy(i,j-2,k)

vt  (j-2) = ...
      bt  (j-2) = vfl (j-1) = vx(i,j-1,k) + vy(i,j-1,k)

vt  (j-1) = ..
      bt  (j-1) = ...
      vfl (j)   = vx(i,j,k) + vy(i,j,k)

vt  (j)   = ...
      bt  (j)   = ...
      vfl (j+1) = vx(i,j+1,k) + vy(i,j+1,k)
      vt  (j+1) = ...
      bt  (j+1) = ...
      dqm      = ( vt(j-1) - vt(j-2) )
      dqp      = ( vt(j)   - vt(j-1) )
      dv (j-1) = dqm + dqp
      dqm      = ( bt(j-1) - bt(j-2) )
      dqp      = ( bt(j)   - bt(j-1) )
      db (j-1) = dqm + dqp
      dqm      = ( vt(j)   - vt(j-1) )
      dqp      = ( vt(j+1) - vt(j)   )
      dv (j)   = dqm + dqp
      dqm      = ( bt(j)   - bt(j-1) )
      dqp      = ( bt(j+1) - bt(j)   )
      db (j)   = dqm + dqp
      vint(j)= ...
      emf(i,j,k) = vint(j) + vt(j)
      emg(i,j,k) = ...
    enddo
  enddo
enddo
```

*FIG. 3*

*After Scalar Replacement & Dead-Store elimination*

```
do k=1,n
  do i=1,n
    do j=js,je+1
      vflj2    = vx(i,j-2,k) + vy(i,j-2,k)
      vtj2     = ...
      btj2     = ...
      vflj1    = vx(i,j-1,k) + vy(i,j-1,k)
      vtj1     = ...
      btj1     = ...
      vflj     = vx(i,j,k) + vy(i,j,k)
      vtj      = ...
      btj      = ...
      vfljp1   = vx(i,j+1,k) + vy(i,j+1,k)
      vtjp1    = ...
      btjp1    = ...
      dqm      = ( vtj1 - vtj2 )
      dqp      = ( vtj  - vtj1 )
      dvj1     = dqm + dqp
      dqm      = ( btj1 - btj2 )
      dqp      = ( btj  - btj1 )
      dbj1     = dqm + dqp
      dqm      = ( vtj  - vtj1 )
      dqp      = ( vtjp1 - vtj )
      dvj      = dqm + dqp
      dqm      = ( btj  - btj1 )
      dqp      = ( btjp1 - btj )
      dbj      = dqm + dqp
      vintj    = ...
      emf(i,j,k) = vintj + vtj
      emg(i,j,k) = ...
    enddo
  enddo
enddo
```

FIG. 4

*After Loop Interchange*

```
do k=1,n
  do j=js,je+1
    do i=1,n
      vflj2    = vx(i,j-2,k) + vy(i,j-2,k)
      vtj2     = ...
      btj2     = ...
      vflj1    = vx(i,j-1,k) + vy(i,j-1,k)
      vtj1     = ...
      btj1     = ...
      vflj     = vx(i,j,k) + vy(i,j,k)
      vtj      = ...
      btj      = ...
      vfljp1   = vx(i,j+1,k) + vy(i,j+1,k)
      vtjp1    = ...
      btjp1    = ...
      dqm      = ( vtj1 - vtj2 )
      dqp      = ( vtj  - vtj1 )
      dvj1     = dqm + dqp
      dqm      = ( btj1 - btj2 )
      dqp      = ( btj  - btj1 )
      dbj1     = dqm + dqp
      dqm      = ( vtj  - vtj1 )
      dqp      = ( vtjp1 - vtj )
      dvj      = dqm + dqp
      dqm      = ( btj  - btj1 )
      dqp      = ( btjp1 - btj )
      dbj      = dqm + dqp
      vintj    = ...
      emf(i,j,k) = vintj + vtj
      emg(i,j,k) = ...
    enddo
  enddo
enddo
```

FIG. 5

DATA DEPENDENCE TESTING FOR LOOP FUSION WITH CODE REPLICATION, ARRAY CONTRACTION, AND LOOP INTERCHANGE

FIELD

The present disclosure generally relates to the field of computing. More particularly, an embodiment of the invention generally relates to techniques for data dependence testing for loop fusion, e.g., with code replication, array contraction, and/or loop interchange.

BACKGROUND

A compiler may be used to translate source code (e.g., in a human-readable format) into object code (e.g., a machine executable format). For example, a processor may be capable of executing the object code to achieve various results, computations, etc. As may be expected, a compiler plays an important role in generating object code. As a result, how a compiler translates source code into object code may have a direct impact on how efficiently a processor is able to execute the code.

Moreover, loops may generally consume a relatively high number of execution cycles during run-time. Accordingly, optimization of loop code compilation may be an important source for efficiency during program execution. For example, loop overhead may be reduced through loop fusion (also referred to as "loop combining"), where bodies of two adjacent loops are combined if they would iterate the same number of times and none of the data dependences between the statements in the two loops are violated by loop fusion. Accordingly, determination of data dependencies is a prerequisite to performance of loop fusion.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2-5 illustrate various pseudo codes in accordance with some embodiments.

DETAILED DESCRIPTION

Figure 1:
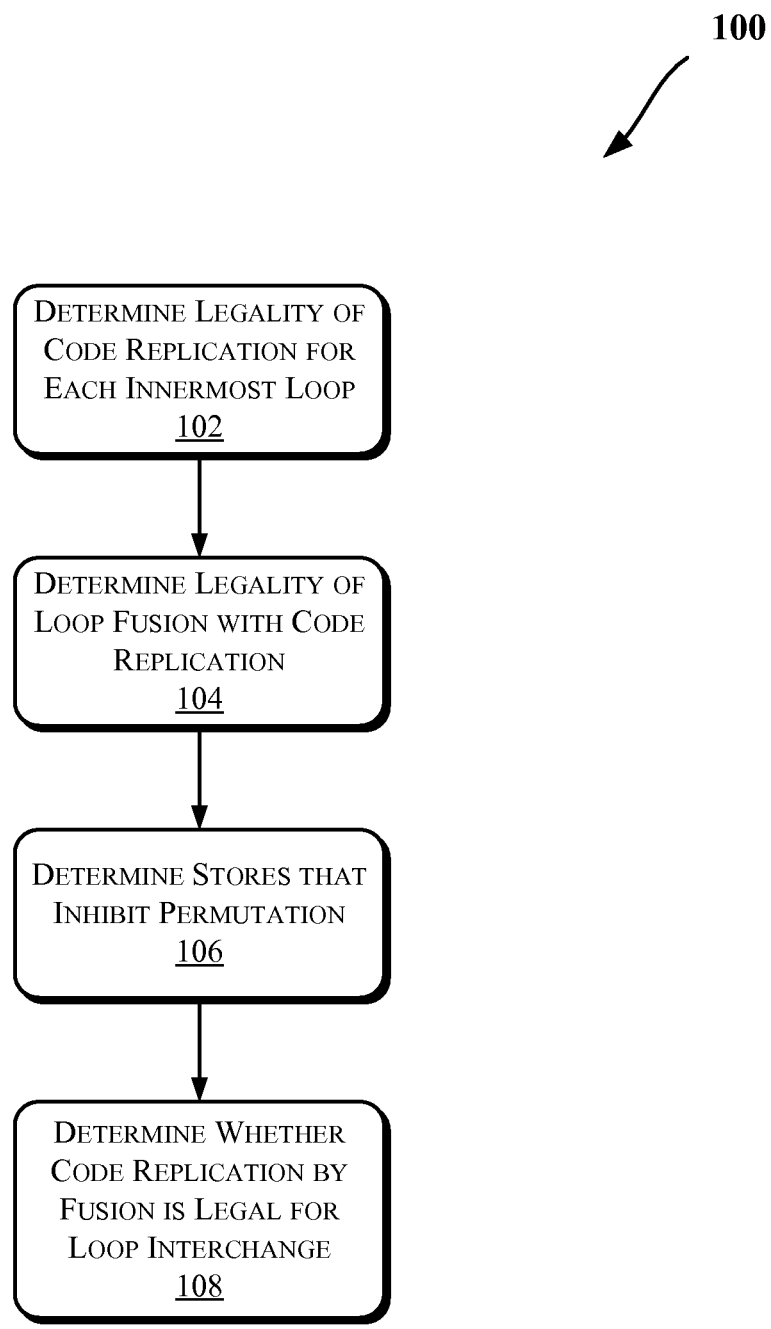
FIG. 1 illustrates a flow diagram of a method according to an embodiment of the invention.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Some of the embodiments discussed herein may be used to facilitate optimization of compilers. For example, some techniques may be used to optimize loop fusion operations. In an embodiment, data dependence testing for loop fusion may be performed, e.g., with code replication, array contraction, and/or loop interchange. Such techniques may be used to test dependencies associated with improving memory locality through code replication in loops that enable various loop transformations. In some embodiments, loop interchange may be performed without loop distribution (where loop distribution is a transformation reverse/opposite to loop fusion, e.g., original loop is broken into several independent loops with the same iteration count).

As discussed herein, "loop fusion" (also referred to as "loop combining") refers to combining bodies of two adjacent loops when they would iterate the same number of times and none of the data dependences between the statements in the two loops are violated by loop fusion. In some cases, two non-adjacent loops may be fused if they can be made adjacent through code-motion (where "code-motion" generally refers to movement of statements between loops by the compiler to before or after the loops based on data-dependence analysis). If the loops do not possess the same number of iterations, loop-peeling or code replication may be used to enable loop fusion. Hence, as discussed herein "code replication" generally refers to conforming the trip count (or number of iterations) of two adjacent innermost loops for loop fusion. Also, "array contraction" (also referred to as "dead-store elimination" or "dead code elimination") generally refers to the removal of instructions that will not have an effect on the behavior of the program. This in turn reduces code size and eliminates unnecessary computations. Moreover, "loop interchange" generally refers to exchanging inner loops with outer loops. For example, when the loop variables index into an array, such a transformation may improve locality of reference, depending on the array's layout.

FIGS. 3, 4, and 5 illustrate sample transformations (according to some embodiments) which may be performed by code replication, fusion, dead-store elimination, and loop interchange respectively in a set of loop nests of FIG. 2. The transformations eventually achieve reasonable memory locality and parallelism as shown in FIG. 5, for example.

Various methods of data dependence may be used to check the legality of loop fusion, loop interchange, or scalar replacement for each loop nest. However, the embodiments discussed herein may also involve code replication as one of the optimizations. Accordingly, some embodiments may be used to perform legality checks for fusion, array contraction, and loop interchange in a set of loop nests considering code replication. In an embodiment, the legality checks may be performed before starting any actual transformations. In one embodiment, a system of unified data dependence testing is disclosed which checks the validity of the entire sequence of transformations before any of the individual optimizations is performed. Without this, one may need to backtrack (revert) the transformations already performed upon detection of illegality of a certain transformation based on some current methods.

In an embodiment, the sequence of transformations described herein may be performed by a compiler to improve the memory locality and parallelism available in a set of loop nests. The compiler code may be stored in a storage device such as those discussed with reference to FIG. 6. Utilizing a compiler implemented technique may lead to performance gains in modern processor architectures, e.g., with multi-cores and fast caches (such as in the computing system of FIG. 6). Note that this improvement in performance may be achieved even though the code replication transformation may increase the size of the loop body, increasing the amount of computation performed per inner loop iteration. These increased costs are believed to generally be outweighed by the potential benefits from improved memory locality due to loop fusion and loop interchange using compiler heuristics. For example, once the heuristics identify a loop nest as a potential candidate for the sequence of transformations, the compiler may use the unified data dependence testing framework proposed herein to check the legality of the entire transformation. In an embodiment, checking the legality of the entire transformation may be performed to maximize the gains attained relative to the situation where only a subset of all the transformations are applied to the loop nest.

One main purpose of code replication of an innermost loop in the sequence of transformations is to make the trip count of two adjacent innermost loops conformable for loop fusion. Here is an example:

```
do j = 1, je + 4
    vfl ( j ) = ...
    vt ( j ) = ...
    bt ( j ) = ...
enddo
```

After code replication by a factor of 3, the above loop becomes:

```
do j = 1, je+1
    vfl ( j ) = ...
    vt ( j ) = ...
    bt ( j ) = ...
    vfl ( j + 1 ) = ...
    vt ( j + 1 ) = ...
    bt ( j + 1 ) = ...
    vfl ( j + 2 ) = ...
    vt ( j + 2 ) = ...
    bt ( j + 2 ) = ...
    vfl ( j + 3 ) = ...
    vt ( j + 3 ) = ...
    bt ( j + 3 ) = ...
enddo
```

As can be seen, this transformation renders the trip count of the replicated loop conformable with an adjacent loop with trip-count je+1 so that the loops may now be fused assuming all legality constraints are satisfied.

In an embodiment, we assume that the loops are normalized to start from a lower bound of one. This is a technique that is used to simplify data dependence analysis and implementation. In the following discussion, we assume that the loop normalization has already been performed by an earlier phase in the compiler.

Some properties of code replication include one or more of the following:

1. The body of the original loop is replicated <r> times (r=3 in the example above) in the replicated loop, where r is the replication factor.

2. Each copied block executes the original loop body for an adjacent iteration. In the example above, the replicated loop body executes the original loop body for iterations j, j+1, j+2, and j+3.

3. The trip count of the replicated loop is lower than the trip count of the original loop by <r>.

4. The order of the iterations in the original loop is preserved in the replicated loop, except that some of the iterations are repeated multiple (up to a maximum of <r>) times.

5. If the legality conditions for code replication (discussed below) are satisfied, the replicated loop preserves the semantics of the original loop.

6. The total amount of work done in the replicated loop is more than the amount of work done in the original loop. This cost is to be evaluated and weighed against the potential benefits from better locality due to loop fusion and loop interchange that are enabled by code replication.

Suppose there is a loop nest of depth n and nest levels are numbered by index k so that $0 \le k \le n-1$. Outermost loop has level number 0, innermost loop has level number n−1.

Moreover, suppose that there is a dependence from statement S1 on iteration i of a loop nest and statement S2 on iteration j, then the dependence distance vector d(i, j) is defined as a vector of length n such that $d(i, j)k = jk - ik$, $0 \le k \le n-1$ Additionally, suppose that there is a dependence from statement S1 on iteration i of a loop nest of n loops and statement S2 on iteration j; then the dependence direction vector D(i, j) is defined as a vector of length n such that:

$$D(i, j)k = \text{"<"} \text{ if } d(i, j)k > 0$$

$$\text{"="} \text{ if } d(i, j)k = 0$$

$$\text{">"} \text{ if } d(i, j)k < 0$$

We use the symbol "*" herein to denote that a particular element of the dependence direction vector could be any of $\{<, =, >\}$.

Moreover, one may assume that the sequence of transformations involving code replication (including the replication factors), loop fusion, dead-store elimination (or array contraction), and loop interchange have already been identified. Note that code replication may be performed only on some of the innermost loops in an embodiment.

Referring to FIG. 1, a flow diagram of an embodiment of a method 100 is illustrated. The method 100 may be used to optimize memory locality, e.g., involving code replication with fusion and permutation. In an embodiment, one or more operations of method 100 may be performed by a compiler. Furthermore, the code for the compiler may be stored on a storage device (such as the storage devices discussed with reference to FIG. 6) and executed on a processor with one or more processing cores (such as those discussed with reference to FIG. 6).

Referring to FIG. 1, at an operation 102, it may be determined whether code replication is legal with respect to data dependence for references within each innermost loop, where code replication is required. Any intra-loop (or loop-independent) anti-dependence is considered illegal for code replication. A dependence with direction vector (*) is a subset of this. Note that the value of the replication factor may play no role in the legality check for code replication. Also, any type of loop-carried (or inter-iteration) dependences may not affect the legality for code replication. Another observation is that code replication may be different from loop alignment performed for loop fusion. More specifically, code replication may be done in a forward direction only, but loop alignment may involve possible peeling on both ends of the loop. More differences of loop replication from conventional loop transformations (loop alignment, unroll) are illustrated in Table 1. Here N is original loop trip count, a is alignment factor, u is unroll factor, and r is the replication factor

TABLE 1

|  | Loop alignment | Loop unroll | Loop replication |
| --- | --- | --- | --- |
| Loop body copying | no | yes | yes |
| Prolog/epilog | yes | yes | no |
| New trip count | N − a | N/u | N − r |
| Total work | =original | =original | ≥original |

Below are some examples where code replication is illegal. Note that there is an intra-loop anti-dependence in each of the following examples.

```
a.   do i = 1, n
         sum = sum + a( i )
         b( i, j, k ) = sum
     enddo
```

If we replicate the statements, it may be observed easily that b will be storing incorrect values.

```
b.   do i = 1, n
         a( i ) = a( i ) + 1
     enddo
```

If we replicate the statements here, the final value stored in a(i) for some indices will be wrong.

```
c.   do i = 1, n
         ... = x
         ...
         x = ...
     enddo
```

If we replicate the statements here, the final value stored in x may be wrong.

In the section below, an example is shown where code replication is legal.

```
d.   do i = 1, n
         a( i + 1 ) = a( i ) + 2
     enddo
```

Here we have a loop-carried flow dependence with distance 1. After replication with a factor of 1, we get:

```
do i = 1, n − 1
    a( i + 1 ) = a( i ) + 2
    a( i + 2 ) = a( i + 1 ) + 2
enddo
```

Note that the final values stored in a are the same as in the original loop even though most assignments (all except stores to the two end elements—a(1) and a(n+1)) happen twice.

At an operation 104, it may be determined whether loop fusion with code replication (across loops) is legal. In an embodiment, the sequence of transformations has already identified a set of loops that have to be fused, where each of these loops (or sub-loops) may also have to be replicated (and the replication factor r has already been determined) before the fusion is performed. The legality checks at operation 104 may have to be applied per fusion of two loops. If there are more than two loops to be fused, then the legality checks may be applied for the first two loops, and the dependences corresponding to the first two loops are merged and then we continue with the legality checks for the fused loop with the third loop and so on.

In an embodiment, for fusion of two loops without code replication, fusion is illegal when a loop-independent dependence becomes a backward loop-carried dependence after fusion. In other words, any type of lexically-backward dependence is considered to be preventing fusion (or fusion-preventing). Also, given two loops to be fused with code replication and the replication factor for the first loop as r1 and the replication factor of the second loop as r2, first all the dependences between the two loops L1 and L2 may be determined. Accordingly, in an embodiment, operation 104 may determine legality of loop fusion with code replication across at least two adjacent loops of the plurality of inner loops discussed above with reference to operation 102.

Below are the set of rules for fusion to be legal in accordance with one embodiment:

a) If there are any dependence edges from L2 to L1 with direction-vector (<), regular fusion itself is illegal, and this does not change with code replication.

b) The replication of the first loop does not add any new constraints for fusion.

c) Considering the replication of only the second loop, if there is any dependence (e.g., flow, anti, or output) from L1 to L2, fusion is legal only if r2 is less than or equal to this dependence distance. Note that if this dependence distance is unknown, then fusion is considered to be illegal.

Below are a few examples:

```
I.   do i = 1, n + 2
         b( i + 2 ) = a( i + 2 )
     enddo
     do i = 1, n
         a( i ) = c( i )
     enddo
```

The above example shows a case that has a lexically-forward anti-dependence of (<), and a dependence distance of 2.

Assume that the second loop is not replicated (r2=0). If we replicate the first loop with r1=2, then we will get a(i+3), a(i+4), etc. in the first loop after replication. This will not change the direction vector (<), and the dependences remain forward-carried. So fusion remains legal after replication of the first loop. This dependence will be processed by rule b above. Another example is:

```
II.  do i = 1, n
         b( i + 2 ) = a( i + 2 )
     enddo
```

```
            do i = 1, n + 3
                a( i ) = c( i )
            enddo
```

The above example shows a case that has a lexically-forward anti-dependence of (<), and a dependence-distance of 2.

Assume that the second loop is replicated with r2=3 and the first loop is not replicated (r1=0). This results in assignments to a(i), a(i+1), a(i+2), a(i+3), etc. in the second loop after replication. This makes it illegal for fusion since the first loop is supposed to use the old values of array a, and this property is violated after fusion with replication of the second loop. Here r2 (=3) is greater than the dependence distance (=2) that makes fusion illegal as per rule c above.

At an operation 106, stores into 1-dimensional local arrays that inhibit loop permutation are determined. In an embodiment, operation 106 may be utilized to determine whether such stores may be eliminated after code replication and loop fusion. If not, these stores prevent loop permutation. We assume that these 1-dimensional arrays are not live after the current loop nest. As an example, consider:

```
            do i
                do j
                    do k = 1, n
                        wk( k ) = a( i, j, k )
                        b( i, j, k ) = wk( k ) + 1.0
                    enddo
                    do k = 1, n + 2
                        c( i, j, k ) = wk( k )
                    enddo
                enddo
            enddo
```

If the second loop is replicated two times, r2=2 (and no replication in the first loop, r1=0), we will obtain references wk(k+1), wk(k+2) in the second loop. In this case, we may no longer delete the stores into wk after loop fusion. If the loop has a replication factor of r, the uses of any 1-dimensional array element has to be dominated by a definition of the same element in the same loop or preceding loops (in the same iteration after replication) for the stores to be deleted.

The example given below is similar to the one above except that the first loop is replicated with a factor greater than two and has a larger trip count. In this case, the stores to wk may be deleted after fusion.

```
            do i
                do j
                    do k = 1, n + 3
                        wk( k ) = a( i, j, k )
                        b( i, j, k ) = wk( k ) + 1.0
                    enddo
                    do k = 1, n + 2
                        c( i, j, k ) = wk( k )
                    enddo
                enddo
            enddo
```

Here if the first loop is replicated three times (r1=3) and the second loop is replicated two times (r2=2), we will get:

```
            do i
                do j
                    do k = 1, n
                        wk( k ) = a( i, j, k )
                        b( i, j, k ) = wk( k ) + 1.0
                        wk( k + 1 ) = a( i, j, k + 1 )
                        b( i, j, k + 1 ) = wk( k + 1 ) + 1.0
                        wk( k + 2 ) = a( i, j, k + 1 )
                        b( i, j, k + 2 ) = wk( k + 2 ) + 1.0
                        wk( k + 3 ) = a( i, j, k + 2 )
                        b( i, j, k + 2 ) = wk( k + 3 ) + 1.0
                    enddo
                    do k = 1, n
                        c( i, j, k ) = wk( k )
                        c( i, j, k + 1 ) = wk( k + 1 )
                        c( i, j, k + 2 ) = wk( k + 2 )
                    enddo
                enddo
            enddo
```

After fusion, now all the stores into wk may be replaced by local scalar variables, and permutation may proceed.

In general, if there is an upward-exposed use in the second loop and the replication factor of the second loop is r2, the preceding loop has a definition with dependence distance of d and a replication factor r1 such that (d+r1)>=r2. (In the example above, d=0, r1=3, and r2=2, so all stores may be deleted after fusion).

At an operation 108, it may be predicted ahead if code replication by fusion is legal for loop interchange. Without code replication, the direction vector corresponding to an interchange-preventing dependence is ( . . . , <, . . . , >, . . . ), where " . . . " denotes any possible dependencies for intermediate loops in the loop nest. After loop interchange, such a dependence becomes ( . . . , >, . . . , <, . . . ) which accesses data in a different order making the loop interchange or permutation illegal. In other words, without further transformation such as loop reversal, any dependence of (>) will prevent an inner loop to be swapped past the level that contains a (<). For example, if the direction vector is (=, <, =, >) in a loop with 4 nesting levels, the innermost loop may not be interchanged with the 1st or the 2nd level. For the purpose of simplicity, we will keep this data dependence checking restricted to subscripts that are separable in an embodiment. This will take care of most applications.

To understand the extensions required for code replication, let us start with an example.

```
            do i
                do j
                    do k
                        a( i, j, k ) = a( i, j, k ) + 2
                    enddo
                enddo
            enddo
```

Here we have a direction vector of (=, =, =). Assuming we replicate on k—the direction vector becomes (=, =, *). This will not prohibit loop interchange since we have (=) with respect to the outer two levels (loops i and j).

Assuming we have:

```
            do i
                do j
                    do k
```

-continued

```
a ( i, j, k ) = a ( i + 1, j, k ) + 2
    enddo
  enddo
enddo
```

Here we have a direction vector of (<, =, =). After code replication, the newly added direction vector becomes (<, =, *). That vector makes loop interchange (involving i and k loops) illegal after replication.

Accordingly, given a loop nest with some inner loops that are replicated and a sequence of fusion and permutation transformations, at operation 108, we want to find out if the permutation is legal after replication and fusion. In an embodiment, the references from all loop fusion candidate (e.g., all inner loops that are indicated as fusible) may be merged to generate the data dependencies for the entire loop nest. Now each dependence needs to be examined one by one to see if the permutation legality checks are satisfied as given below (the dependences arising out of stores that will be replaced by local scalar variables as discussed above may be ignored).

For each loop that is replicated, the direction corresponding to that loop may be replaced with a '*' in the direction vector. Next, it may be determined whether the direction vector contains a '<' in an outer-level and a '>' (or '*') in any inner-levels starting from the outermost loop that is involved in the permutation. If so, loop-permutation is considered to be illegal. There are other profitability tradeoffs related to loop trip counts that one may consider while deciding whether interchange should be performed.

Figure 6:
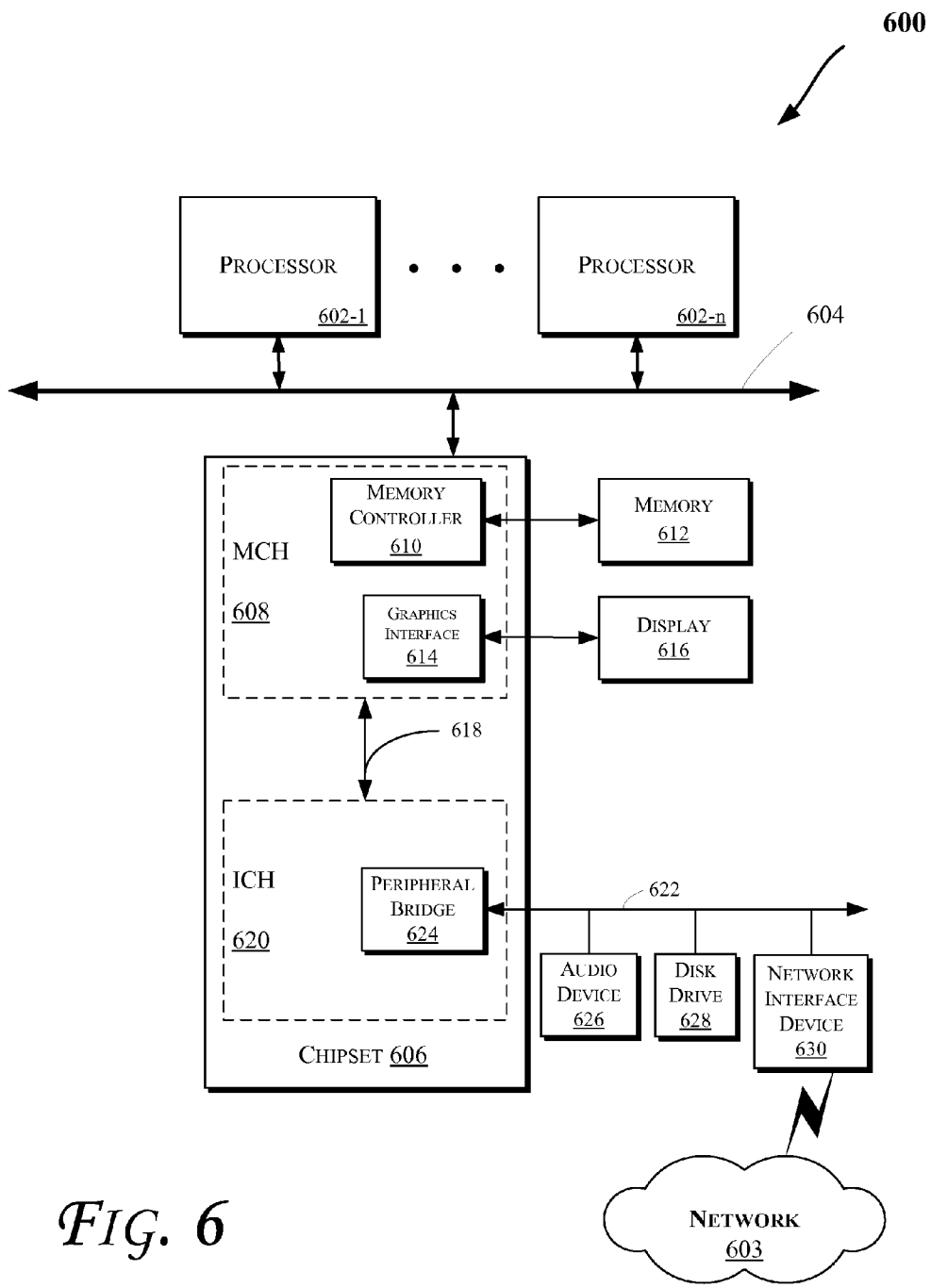
FIG. 6 illustrates a block diagram of an embodiment of a computing system, which may be utilized to implement various embodiments discussed herein.

FIG. 6 illustrates a block diagram of an embodiment of a computing system 600. In various embodiments, one or more of the components of the system 600 may be provided in various electronic devices capable of performing one or more of the operations discussed herein with reference to various embodiments of the invention. For example, one or more of the components of the system 600 may be provided in a personal computer (such as a desktop computer, a laptop computer, a workstation, etc.), a server computer (e.g., a remote server computer), digital media device (such as a Moving Picture Experts Group Layer-3 Audio (MP3) or a Moving Picture Experts Group 4 (MPEG4) device), a set-top box, a personal video recorder (PVR), a personal digital assistant (PDA), a mobile phone (such as a cellular phone or an Internet protocol (IP) phone), etc.

Moreover, the computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. The processors 602 may also include one or more caches, such as a shared cache (e.g., a cache shared amongst two or more processors or processor cores) and/or a private cache (e.g., a cache dedicated to a single processor or single processor core). Also, various levels of cache may be used including for example, a level 1 (L1) cache, a level 2 (L2) cache, a mid-level cache (LLC), and/or a last-level cache (LLC). Moreover, the operations discussed with reference to FIGS. 1-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612. The memory 612 (and/or caches discussed above and/or disk drive 628) may store data, including sequences of instructions that are executed by the CPU 602 (such as a compiler discussed with reference to FIGS. 1-5), or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display 616. In one embodiment of the invention, the graphics interface 614 may communicate with the display 616 via a graphics accelerator, including, for example, an accelerated graphics port (AGP). In an embodiment of the invention, the display 616 may be a flat panel display that communicates with the graphics interface 614 through, for example, a signal converter that translates a digital representation of an image stored in a storage device such as video memory or system memory into display signals that are interpreted and displayed by the display 616. The display signals produced by the interface 614 may pass through various control devices before being interpreted by and subsequently displayed on the display 616.

A hub interface 618 may allow the MCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630, which may be in communication with the computer network 603. In an embodiment, the device 630 may be a NIC (Network Interface Card) capable of wireless communication. Other devices may communicate via the bus 622. Also, various components (such as the network interface device 630) may communicate with the MCH 608 in some embodiments of the invention. In addition, the processor 602 and the MCH 608 may be combined to form a single chip. Furthermore, a graphics accelerator may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 600 may be arranged in a point-to-point (PtP) configuration. For example, processors, memory, and/or input/output devices may be interconnected by a number of point-to-point interfaces.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIG. 6.

Additionally, such computer-readable media may be downloaded as a computer program product, wherein the program may be transferred from a remote computer (e.g., a server) to a requesting computer (e.g., a client) by way of data signals via a communication link (e.g., a bus, a modem, or a network connection).

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus to optimize memory locality involving code replication with fusion and permutation, the apparatus comprising:
    a storage device to store compiler code; and
    a processor to execute the compiler code to:
        determine whether code replication is legal with respect to data dependence for references within each innermost loop of a plurality of inner loops of a loop nest;
        determine legality of loop fusion with code replication across at least two adjacent loops of the plurality of inner loops;
        determine store operations that inhibit loop permutation from one-dimensional local arrays, wherein the determination of the store operations indicates if an elimination of the store operations after code replication and loop fusion is executed, wherein if it is determined not to eliminate the store operations, loop permutation is not permitted; and
        determine without loop distribution whether code replication by fusion is legal for loop interchange, wherein if the loop permutation is legal after replication and fusion, all inner loops that are indicated as fusible are merged to generate data dependencies for the entire loop nest and wherein each of the data dependencies is checked to determine if permutation legality checks are satisfied.

2. The apparatus of claim 1, wherein the processor is to execute the compiler code to determine whether a permutation transformation is legal after code replication and loop fusion of the plurality of inner loops.

3. The apparatus of claim 1, wherein the processor is to execute the compiler code to determine legality of loop fusion without a transformation that is reverse or opposite to the loop fusion.

4. The apparatus of claim 1, wherein the processor is to check the data dependences for the entire loop nest prior to any code replication.

5. The apparatus of claim 1, wherein the processor is to determine legality of code replication for the plurality of inner loops prior to fusing two or more of the plurality of inner loops.

6. The apparatus of claim 1, wherein the storage device comprises one or more of a cache, a disk drive, or a main memory.

7. The apparatus of claim 1, wherein the processor comprises the storage device.

8. The apparatus of claim 1, wherein the processor comprises one or more processor cores.

9. A non-transitory computer-readable medium comprising one or more instructions that when executed on a processor configure the processor to:
    determine whether code replication is legal with respect to data dependence for references within each innermost loop of a plurality of inner loops of a loop nest;
    determine legality of loop fusion with code replication across at least two adjacent loops of the plurality of inner loops;
    determine store operations that inhibit loop permutation from one-dimensional local arrays, wherein the determination of the store operations indicates if an elimination of the store operations after code replication and loop fusion is executed, wherein if it is determined not to eliminate the store operations, loop permutation is not permitted; and
    determine without loop distribution whether code replication by fusion is legal for loop interchange, wherein if the loop permutation is legal after replication and fusion, all inner loops that are indicated as fusible are merged to generate data dependencies for the entire loop nest and wherein each of the data dependencies is checked to determine if permutation legality checks are satisfied.

10. The non-transitory computer-readable medium of claim 9, further comprising one or more instructions that configure the processor to determine whether a permutation transformation is legal after code replication and loop fusion of the plurality of inner loops.

11. The non-transitory computer-readable medium of claim 9, further comprising one or more instructions that configure the processor to merge references from all the plurality of inner loops and generate data dependencies for the entire loop nest.

12. The non-transitory computer-readable medium of claim 9, further comprising one or more instructions that configure the processor to determine legality of code replication for the plurality of inner loops prior to fusing two or more of the plurality of inner loops.

13. The non-transitory computer-readable medium of claim 9, further comprising one or more instructions that configure the processor to check the data dependences for the entire loop nest prior to any code replication.

14. A method to optimize memory locality involving code replication with fusion and permutation, the method comprising:
- determining whether code replication is legal with respect to data dependence for references within each innermost loop of a plurality of inner loops of a loop nest;
- determining legality of loop fusion with code replication across at least two adjacent loops of the plurality of inner loops;
- determining store operations that inhibit loop permutation from one-dimensional local arrays, wherein the determination of the store operations indicates if an elimination of the store operations after code replication and loop fusion is executed, wherein if it is determined not to eliminate the store operations, loop permutation is not permitted; and
- determining without loop distribution whether code replication by fusion is legal for loop interchange, wherein if the loop permutation is legal after replication and fusion, all inner loops that are indicated as fusible are merged to generate data dependencies for the entire loop nest and wherein each of the data dependencies is checked to determine if permutation legality checks are satisfied.

15. The method of claim 14, further comprising determining whether a permutation transformation is legal after code replication and loop fusion of the plurality of inner loops.

16. The method of claim 14, further comprising merging references from all the plurality of inner loops and generate data dependencies for the entire loop nest.

17. The method of claim 14, further comprising determining legality of code replication for the plurality of inner loops prior to fusing two or more of the plurality of inner loops.

18. The method of claim 14, further comprising checking the data dependences for the entire loop nest prior to any code replication.

* * * * *